(No Model.)
M. LEITCH.
THERMOSTATIC VALVE.
No. 564,791. Patented July 28, 1896.
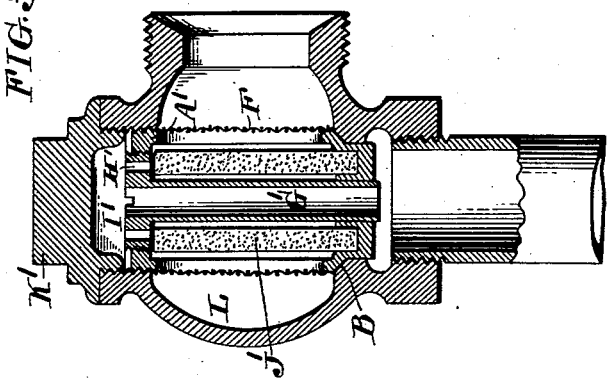
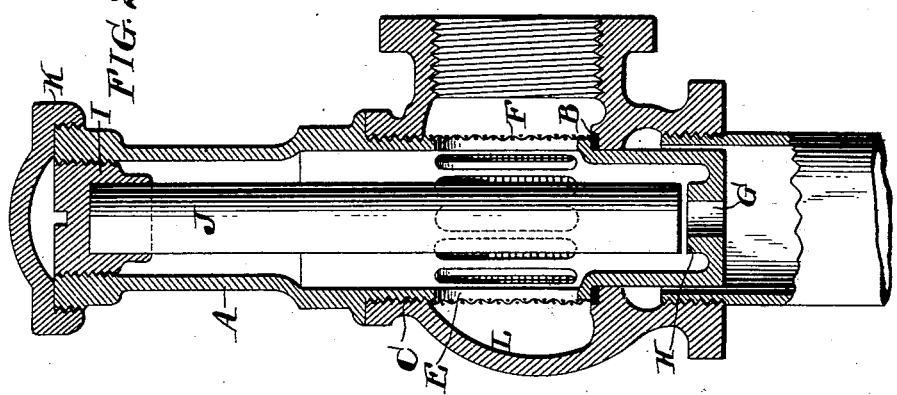
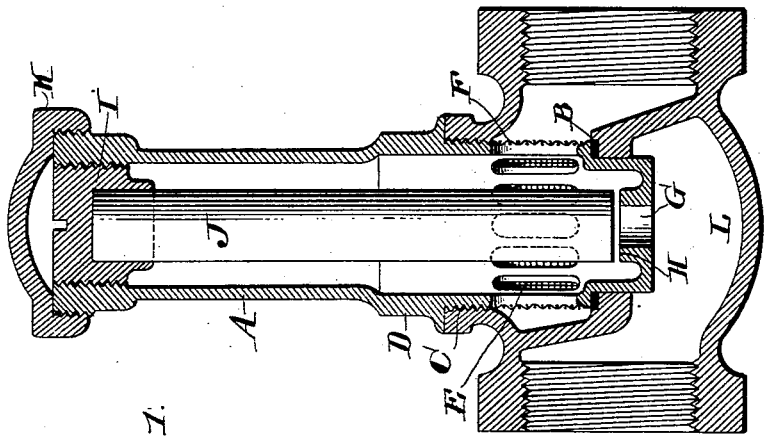
Witnesses. Inventor.
Meredith Leitch
Attorney.

UNITED STATES PATENT OFFICE.

MEREDITH LEITCH, OF RICHMOND, VIRGINIA, ASSIGNOR TO THE WARREN WEBSTER & COMPANY, OF CAMDEN, NEW JERSEY.

THERMOSTATIC VALVE.

SPECIFICATION forming part of Letters Patent No. 564,791, dated July 28, 1896.

Application filed February 25, 1896. Serial No. 580,744. (No model.)

*To all whom it may concern:*

Be it known that I, MEREDITH LEITCH, of Richmond, county of Henrico, and State of Virginia, have invented an Improvement in Thermostatic Valves, of which the following is a specification.

My invention has reference to thermostatic valves; and it consists in certain improvements, which are fully set forth in the following specification and are shown in the accompanying drawings, which form a part thereof.

Thermostatic valves are designed to open and close according to the temperature of the contents of the valve or its connecting pipes or radiators.

The invention set out hereinafter is especially designed for the purpose of changing an ordinary globe or angle valve to a valve possessing all the essential advantages of a perfect thermostatic valve without removing the old valve-body from place in the system or breaking the pipe connections. There is a most important feature of economy by the use of my invention in changing any heating system from one using the old globe or angle valves to one requiring thermostatic valves, the expense of which change in some cases would be more than the advantage gained.

If the old angle or globe valve should have to be entirely removed and changes should have to be made in the surrounding pipe to suit an entirely new valve, I propose to use the old valve-body, after having first removed the valve, valve-stem, cap, stuffing-box, and wheel, by inserting into the said old valve without breaking the pipe connections my improved thermostatic-valve structure, as shown in the accompanying drawings.

While my invention is especially designed to permit the ready change of a globe or angle valve into a thermostatic valve without changing or breaking the pipe connections, it is not confined to that use, because I may embody with my improvements the body part as now found on the market and thus have a complete thermostatic valve adapted for new use with any new construction requiring such valves.

In the drawings, Figure 1 is a sectional elevation of a valve embodying my improvements, and Figs. 2 and 3 are similar views of modified forms of said invention.

In Figs. 1 and 2, L represents the old valve-body, from which have been removed the valve, valve-stem, cap, stuffing-box, and wheel.

A is a cylindrical cage provided with a shoulder B, suited to fit upon the old valve-seat with or without an intervening packing-washer or other packing. This cap has a threaded part C at the top, which is adapted to fit the threads from which the old cap has been unscrewed.

D is a hexagonal part to enable the cage to be screwed into the body, and holes E are provided in the side walls for passage of water and air. The holes E are covered with a suitable screen F to prevent the passage of dirt and other solid materials. Through the lower or bottom portion of the cage is a hole G for the passage of water and air, and on the inside is provided the valve-seat H, which is preferably a part of the cage. The upper internal part of the cage is threaded for the screw-plug I, into which is secured the expanding composition plug or valve J, adjustable to and from the seat H by the screw-plug I.

K is a cap which is screwed on the top of the cage-body A to prevent accidental displacing of the valve and to make the device air-tight.

The parts of a thermostatic valve as described having been assembled, and the cage made of dimensions to suit the old valve-body, it is only necessary to unscrew the old parts heretofore mentioned and screw in the cage containing the parts, adjust the valve by means of the screw-plug, put on the cap K, and the change is complete from an ordinary angle or globe valve to a perfect thermostatic valve.

In Fig. 1 the body L is shown as of a shape used in regular globe-valves, while in Fig. 2 the body is that used in angle-valves. In this latter figure I have shown the lower part of the cage A extended downward so as to bring the seat H very low down, even into the discharge-pipe, with the object of either increasing the length of the valve-rod J or shortening the height of the cage above the valve-body, or both. It is evident that the longer the valve-rod J the more sensitive is the valve and less accuracy is required in adjusting the thermostatic valve as a whole.

In the construction shown in Fig. 3 the body is shown as containing the cage wholly within it. In this case the cage seats upon the valve-seat B, as before, and is held down by the screw at its top, engaging with the threads of the body. I have shown the valve-rod or valve J' of the expansible material formed tubular and secured to the bottom of the cage A' and working in connection with a valve-seat H' in the plug I', which is adjustable to or from the valve J' by being screwed into the top of the cage. There is also a central tube G' extending through the plug I' and opening at the bottom through the cage, so that the water and air may pass through the cage, valve-seat H', and down through this central tube G' to the discharge-pipe. A cap K' is screwed down upon the valve-body, as is customary in check-valves, to seal the valve.

A screen F may be used, as in Figs. 1 and 2, to prevent solid materials getting into the cage.

In all of these constructions I have a cage adapted to fit into an old form of body part and closing the valve-seat thereof, apertures through the cage for the discharge of the water and air, an expansible valve to control the flow of water and air, an adjustable plug to regulate the distance of the valve-seat from the valve, and a cap or cover to seal the valve.

While I prefer the construction shown, the details thereof may be modified without departing from the principles of my invention.

Having now described my invention, what I claim as new, and desire to secure by Letters Patent, is—

1. In a thermostatic valve, the combination of a cage adapted to fit the body of an ordinary globe or angle valve so as to close the valve-seat in said body and provided further with a valve-seat discharging through the said cage into the discharge chamber or side of the body, with an expansible valve supported within the cage and adapted to expand under varying temperature to close or open the valve-seat aperture in said cage.

2. In a thermostatic valve, the combination of a cage provided with screw-threads adapted to fit the threaded portion of the body of an ordinary globe or angle valve above the valve-seat so as to close the valve-seat in said body and provided further with a valve-seat discharging through the said cage into the discharge chamber or side of the body, with an expansible valve supported within the cage and adapted to expand under varying temperatures to close or open the valve-seat apertures in said cage, an adjustable plug holding the valve adjustably within the cage to adjust the valve to or from the seat in the cage, and a cap to seal the said plug and valve from the atmosphere whereby the cage and adjusted valve may be removed from or inserted into the body without disturbing the adjustment of valve and seat.

3. In a thermostatic valve, a cage having lateral inlet-ports adapted to be secured within the body of a globe or angle valve and further containing an annular shoulder or flange to fit upon the valve-seat and close the aperture of the body and also provided with a valve-seat arranged concentric to the valve-seat opening in the body between the inlet and discharge chambers, in combination with a cylindrical expansible valve held within the cage immovable at one end and having the other end movable to or from the valve-seat of the cage, and a cap to seal the cage and valve-body against admission of air.

4. In a thermostatic valve, a cage adapted to fit the body of an ordinary globe or angle valve so as to close the valve-seat in said body and extend through and to a distance below said seat and provided with a valve-seat in its extended part discharging into the discharge chamber or side of the body, in combination with an expansible valve supported within the cage and adapted to expand under varying temperature to close or open the valve-seat aperture in said cage, whereby a long expansible valve may be secured with a minimum height of valve.

In testimony of which invention I have hereunto set my hand.

MEREDITH LEITCH.

Witnesses:
R. M. HUNTER,
WM. L. EVANS.